Nov. 5, 1968    E. A. ANDERSON    3,408,730

METHOD OF MAKING ANTI-SKID ELEMENTS

Filed Jan. 20, 1966

INVENTOR
EDWARD A. ANDERSON

BY *Hoffmann and Yount*

ATTORNEYS 3,408,730
Patented Nov. 5, 1968

3,408,730
METHOD OF MAKING ANTI-SKID ELEMENTS
Edward A. Anderson, Cleveland Heights, Ohio, assignor to The Lamson & Sessions Co., Cleveland, Ohio, a corporation of Ohio
Filed Jan. 20, 1966, Ser. No. 521,906
4 Claims. (Cl. 29—505)

ABSTRACT OF THE DISCLOSURE

Method of making an anti-skid element in which a carbide insert is pressed into a block of metal with the insert being used as a punch.

---

The present invention relates to a method for making anti-skid elements for use in vehicle tires, and in particular to a method for making a tire stud having a metal body and an elongated wear resistant insert embedded within the metal body and projecting outwardly of one end thereof.

An important object of the present invention is to provide a new and improved method for making an anti-skid element or tire stud of the character described and in which an elongated wear resistant insert, preferably one made from a carbide material and provided with a rough or serrated outer peripheral surface, is embedded within a metal body while the latter is laterally or radially constrained by relatively moving the insert and metal body axially toward and into engagement with one another under a metal deforming pressure to cause metal from the metal body to be cold flowed or extruded in an axial direction to surround and engage the outer periphery of the insert to cause the insert to be firmly embedded and retained within the metal body.

Another object of the present invention is to provide a new and improved method for making an anti-skid element or tire stud, as defined in the preceding object, and which is carried out by using the wear resistant insert itself as a punch.

The novel method of the present invention provides a simple, economical and high production method for making anti-skid elements or tire studs.

Other objects, novel characteristics and advantages of this invention will be apparent in the following detailed description and in the accompanying drawings forming a part of this specification and in which.

Figure 1:
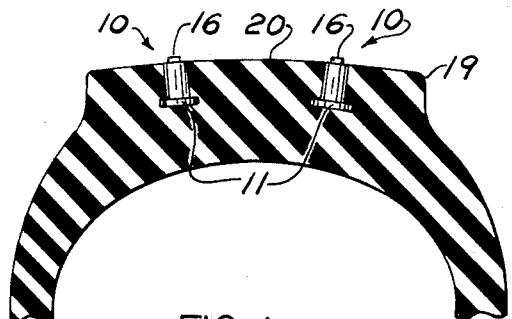
FIG. 1 is a fragmentary cross-sectional view of a tire showing tire studs made in accordance with the method of the present invention anchored therein.

As one embodiment of an anti-skid element made in accordance with the novel method of the present invention, the drawings show a tire stud 10. The tire stud 10 comprises a headed metal body 11 which is generally T-shaped, as viewed in axial cross section. The metal body has a shank portion 12 which is here shown as being cylindrical in shape and a head portion 14 at one end of the shank portion. The head portion 14 can be formed to any suitable external configuration and is here shown as having a generally cylindrical shape.

The tire stud 10 further comprises an elongated wear resistant insert 16 which is embedded within the shank portion 12 by a cold extrusion operation, as will hereinafter be more fully described, and which projects outwardly slightly from the end of the shank portion 12 remote from the head portion 14. The insert 16 is generally cylindrical in shape and preferably has a roughened or serrated outer peripheral surface to provide a multiplicity of radially or generally radially outwardly extending protrusions 18. The wear resistant insert can be made from any suitable material which is harder than the metal body 11, but is preferably made from a carbide material, such as tungsten carbide. The insert 16 is securely retained within the shank portion 12 of the metal body when embedded therein due to the engagement between the metal and its outer peripheral surface and due to the metal which is flowed radially inwardly between the protrusions 18 thereon during the cold extrusion operation.

The tire studs 10 are usable in a vehicle tire 19 for the purpose of providing traction between its road engaging surface 20 and the road and to prevent sliding or skidding of the vehicle when ice or snow are on the road. The tire studs 10 can be anchored within the tire so that their ends remote from the head portions thereof project slightly outwardly of the road engaging surface thereof in any suitable or conventional manner. The wear resistant insert 16 of each of the tire studs 10, since it does not wear as fast as the metal body 12 or the tire 19, insures that the stud 10 will protrude outwardly of the road engaging surface 20 of the tire for the life of the tire.

Figure 2:
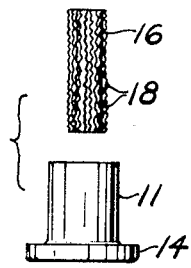
FIG. 2 is a side elevational view of the components used to form the tire stud shown in FIG. 1 prior to their being assembled.

In accordance with the provisions of the present invention, a novel method of making the tire stud 10 is provided in which an elongated wear resistance insert is embedded within a longitudinally extending shank portion of a metal body while the latter is radially constrained by relatively moving the insert and metal body axially toward each other and into engagement with each other under pressure of a metal deforming intensity to cause metal from the shank portion of the metal body to be cold flowed or extruded in an axial direction to surround the outer periphery of the insert. The method, in the preferred embodiment, is carried out by providing a metal body having an axially or longitudinally extending shank portion and a head portion at one end of the shank portion, as shown in FIG. 2, prior to embedding the insert within the metal body. The metal body provided can be preformed to the configuration described or shown in FIG. 2 from a metal slug by any suitable or conventional process such as by a cold forming operation performed in a suitable die apparatus.

Figure 4:
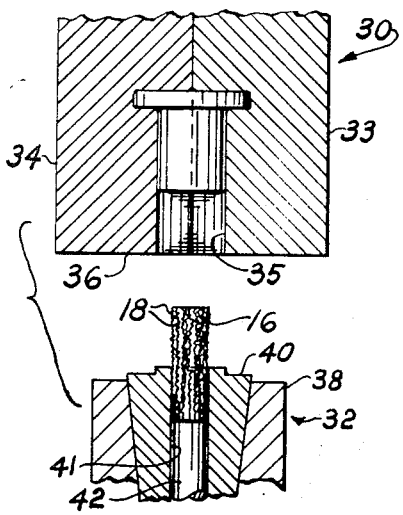
FIG. 4 is an axial cross-sectional view of a die means and a punch holder unit which can be employed for carrying out the method of the present invention.

Referring to FIG. 4, a die means 30 for radially constraining and holding the metal body and a punch unit 32 for slidably receiving a punch, which in the preferred embodiment is the insert itself, are there shown and which may be employed in a suitable power actuated die apparatus or press for carrying out the extruding operation in which the insert is embedded within the metal body. The die means 30 comprises a pair of complemental die sections 33, 34 which define a generally T-shaped die cavity, as viewed in cross section, corresponding in shape to the T-shaped metal body and which are relatively movable toward and from one another between an open position in which the headed metal body can be placed within the die means 30 and a closed position in which they surround the head and shank portion of the metal body. The die means 30 when in its closed position defines an axial opening 35 extending thereinto from its lower end 36, as viewed in FIG. 4, which communicates with the end of the shank portion of the metal body located axially inwardly of the end 36 and confines or constrains the metal body therein so that metal can only be extruded from the shank portion in a direction toward the end 36.

The punch unit 32 may be of any suitable construction and is here shown as comprising a holder means 38 for holding a guide sleeve or member 40 having an axially extending opening 41 therethrough which slidably receives the insert 16 when the latter is inserted therein. The punch unit 32 further includes an actuating rod or member 42 slidably received within the opening 41 and against which one end of the insert 16 bears. The actuating rod 42 is adapted to be moved relative to the sleeve 40 through a work stroke in which it causes the insert 16 to be embedded within the shank portion of the metal body and a return stroke. The rod 42 can be moved through its work and return strokes by any suitable or conventional mechanism in the press and is in the position shown in FIG. 4 when at the end of its return stroke. The guide sleeve 40 guides and steadies the insert 16 to return the same in an axially aligned position with respect to the metal body in the die means 30 as it is moved outwardly relative to the sleeve 40 when the rod 42 is moved through its work stroke.

Figure 3:
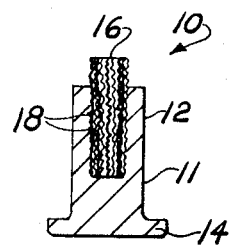
FIG. 3 is an axial cross-sectional view of the tire stud shown in FIG. 1.

The cold extrusion operation for embedding the insert 16 within the metal body is carried out, in the embodiment shown, by moving the punch unit 32 toward the die means 30 until the end of the wear resistant insert 16 engages the end of the metal body remote from its head portion 14 or until the sleeve 40 is located closely adjacent the die means 30. Then the actuating rod 42 is moved through its work stroke under a pressure of a metal deforming intensity to cause the insert 16 to move outwardly relative to the sleeve 40 to cold extrude and flow the metal from the shank portion 12 of a metal body 11 axially toward the end 36 of the die means 30 and circumferentially surround the outer periphery of the insert 16. The extent to which the insert 16 is embedded within the metal body is preferably such that the inner end of the insert is axially spaced somewhat from the head portion 14 of the metal body 11 and its outer end projects slightly outward beyond the outer end of the shank portion 12 of the metal body 11, as shown in FIG. 3.

By providing a wear resistant insert 16 which has a rough or serrated outer peripheral surface, the metal from the shank portion of the metal body as it is extruded is also cold flowed radially inwardly between the adjacent protrusions 18 in the outer peripheral surface to cause the insert 16 to be firmly embedded and retained within the metal body 11. Moreover, by using the insert itself as the punch, an economy of manufacture is effected since punches are subject to rapid wear and have to be replaced from time to time.

From the foregoing it should be apparent that the novel method of the present invention provides a simple, economical and high production method for making anti-skid elements or tire studs of the type having a wear resistant insert embedded within the metallic body thereof.

Although the subject matter of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A method of making an anti-skid element for use in a tire comprising a metal body having a wear resistant insert embedded therein and projecting outwardly of one end thereof comprising the steps of: providing a metal body having an axially extending shank portion, constraining said metal body in a die means having an open end in communication with one end of the shank portion and being spaced axially therefrom so that metal from the shank portion is free to flow only in a direction axially toward said open end of said die means, relatively moving an elongated wear resistant anti-skid insert having a roughened peripheral surface and said die means axially toward one another until said insert engages said end of said shank portion of said metal body, continuing the relative movement of said insert and said die means under pressure of a metal deforming intensity to cause metal from said shank portion to be cold extruded toward the open end of said die means and around only a portion of said roughened outer periphery of said insert to cause said insert to be firmly embedded in said shank portion.

2. The method of making an anti-skid element, as defined in claim 1, wherein said wear resistant insert has a multiplicity of protrusions extending radially outwardly of said peripheral surface and wherein said metal from said shank portion of said metallic body is also cold flowed radially inwardly between adjacent protrusions to firmly embed the wear resistant insert within the shank portion.

3. The method of making an anti-skid element, as defined in claim 1, wherein said wear resistant insert comprises a carbide cylinder which has a multiplicity of protrusions extending radially outwardly of its peripheral surface and wherein the metal from the shank portion is also cold flowed radially inwardly between the adjacent protrusions to firmly embed the wear resistant insert within the shank portion.

4. The method of making an anti-skid element, as defined in claim 1, and wherein the metal body provided has a head portion at one end of the shank portion.

References Cited

UNITED STATES PATENTS

| 3,098,022 | 7/1963 | Karnie | 29—520 X |
| 3,186,466 | 6/1965 | Keinanen | 152—210 |
| 3,125,147 | 3/1964 | Hakka | 152—210 |

FOREIGN PATENTS

| 745,517 | 2/1956 | Great Britain. |

CHARLIE T. MOON, *Primary Examiner.*